(12) United States Patent
Rapoport et al.

(10) Patent No.: US 8,263,948 B2
(45) Date of Patent: Sep. 11, 2012

(54) AUTHENTICATION APPARATUS FOR MOVING VALUE DOCUMENTS

(75) Inventors: William Ross Rapoport, Bridgewater, NJ (US); James Kane, Lawrenceville, NJ (US); Carsten Lau, Niedersachsen (DE)

(73) Assignee: Honeywell International Inc., Morristown, NJ (US)

( * ) Notice: Subject to any disclaimer, the term of this patent is extended or adjusted under 35 U.S.C. 154(b) by 118 days.

(21) Appl. No.: 12/950,390

(22) Filed: Nov. 19, 2010

(65) Prior Publication Data

US 2011/0121203 A1    May 26, 2011

Related U.S. Application Data

(60) Provisional application No. 61/263,624, filed on Nov. 23, 2009.

(51) Int. Cl.
  *G01J 1/58* (2006.01)
(52) U.S. Cl. .................................................. 250/459.1
(58) Field of Classification Search ................ 250/459.1
  See application file for complete search history.

(56) References Cited

U.S. PATENT DOCUMENTS

| | | | |
|---|---|---|---|
| 4,446,204 A | 5/1984 | Kaule et al. | |
| 4,533,244 A * | 8/1985 | Kaule et al. | 356/71 |
| 5,459,323 A | 10/1995 | Morgan | |
| 5,679,959 A | 10/1997 | Nagase | |
| 6,752,319 B2 * | 6/2004 | Ehrhart et al. | 235/486 |
| 6,777,704 B2 * | 8/2004 | Giering | 250/556 |
| 6,914,668 B2 * | 7/2005 | Brestel et al. | 356/72 |
| 7,030,371 B2 | 4/2006 | Vasic et al. | |
| 7,067,824 B2 * | 6/2006 | Muller et al. | 250/458.1 |
| 7,845,570 B2 * | 12/2010 | Schwenk et al. | 235/494 |
| 2006/0017959 A1 * | 1/2006 | Downer et al. | 358/1.14 |
| 2006/0204145 A1 | 9/2006 | Vasic et al. | |
| 2009/0152468 A1 | 6/2009 | Allen et al. | |
| 2011/0052082 A1 * | 3/2011 | Parkov et al. | 382/209 |

FOREIGN PATENT DOCUMENTS

| | | |
|---|---|---|
| JP | 2008197850 A | 8/2008 |
| JP | 2009223607 A | 10/2009 |

* cited by examiner

*Primary Examiner* — David Porta
*Assistant Examiner* — Marcus Taningco
(74) *Attorney, Agent, or Firm* — Ingrassia Fisher & Lorenz, P.C.

(57) ABSTRACT

An authentication apparatus used to authenticate a moving value document with uniform or non-uniform distribution of a pre-selected covert composition that includes an active ion that emits optical radiation at a pre-selected wavelength when excited by exciting incident light. The optical radiation is imaged onto at least one photodetector having first and second detector elements. The imaged intensities are captured at pre-determined times relating to the velocity of the value document. The ratio between the second detector element and the first detector element measured at the same image location or different image locations represents the characteristic decay time intensity data of the pre-selected wavelength emission. The authenticity of the value document is rejected when the pre-selected wavelength emission is not received by the at least one photodetector or when the output electronic signal ratio does not meet expected value.

17 Claims, 2 Drawing Sheets

AUTHENTICATION APPARATUS FOR MOVING VALUE DOCUMENTS

CROSS-REFERENCE TO RELATED APPLICATIONS

This application claims the benefit of U.S. Provisional Application Ser. No. 61/263,624, filed Nov. 23, 2009, currently pending.

TECHNICAL FIELD

The technical field relates generally to a validation apparatus that authenticates a moving value document using an emission wavelength and a decay constant of intensity of the emission of covert compositions incorporated in or on the value document.

BACKGROUND

There are many ways to validate a value document, from simple to complex. Some methods involve visible (i.e. overt) features on or incorporated into a document, such as a hologram on a credit card, an embossed image or watermark on a bank note, a security foil, a security ribbon, colored threads or colored fibers within a bank note, or a floating and/or sinking image on a passport. While these features are easy to detect with the eye and may not require equipment for authentication, these overt features are easily identified by a would-be forger and/or counterfeiter. As such, in addition to overt features, hidden (i.e. covert) features may be incorporated in value documents. Covert features include invisible fluorescent fibers, chemically sensitive stains, fluorescent pigments or dyes that are incorporated into the substrate of the value document. Covert features may also be included in the ink that is printed onto the substrate of the value document or within the resin used to make films that are used in laminated value documents. Since covert features are not detectable by the human eye, detectors configured to detect these covert features are needed to authenticate the value document.

There are many validation systems (e.g. covert features and corresponding detectors) that are used to, for instance, authenticate bank notes. For example, U.S. Pat. No. 4,446,204 to Kaule, et al. discloses a security paper with authenticable features in the form of added or applied coloring agents which on the one hand make it possible to check the IR-transmission properties of the security paper, if appropriate, even in the printed image, and on the other hand have magnetic properties, wherein both IR Transmission and magnetic tests can be uninfluenced by one another but are capable of being carried out at the same position on the security paper. Known detection devices are then used to match detectors to the differently lying spectral region of the authenticable features for validation.

Further, U.S. Pat. No. 5,679,959 to Nagase discloses a bill discriminating apparatus that includes a light source for projecting a stimulating light onto a surface of a bill, a photomultiplier that photoelectrically detects the light emitted from the bill surface in response to the irradiation with the stimulating light and producing detected data corresponding to an amount of the detected light, a ROM for storing reference data, and a central processing unit ("CPU") for comparing the detected data produced by the photomultiplier and the reference data stored in the ROM. Such a system, however, fails to detect a counterfeit document when the detected emitted radiation from the counterfeit is similar to the authentic emitted radiation parameter.

Many known validation systems involve detecting a covert authenticatable feature and evaluating its emission spectra. If the emissions alone are detected, then the value document is deemed authentic, otherwise it is rejected as a counterfeit. One problem with this type of existing validation system arises when the authenticatable feature is entirely contained in the printed ink on a substrate because it is subjected to wear and attrition loss. As a result, there is unpredictable deterioration of the authenticatable feature's emission spectra amplitude, and thus, the authentication apparatus may incorrectly identify an authentic document as a counterfeit. Another problem involves that fact that over time, this method has become less secure since counterfeiters have become more sophisticated and have greater access to scientific apparatus that can detect the incorporation of these features in value documents.

There are existing validation systems that involve detecting the decay time of a phosphor that is excited by a visible or ultraviolet light source in a stationary situation. For example, U.S. Pat. No. 7,030,371 to Vasic et al. discloses security documents or articles carrying luminescent marker compounds which show a time-deferred emission characteristic which are authenticated by a method and device that allows for rapid extraction of characteristic luminescent parameters, such as emission intensity and time constants. In addition, U.S. Publication No. 20090152468 to Allen et al. discloses a technique and apparatus for detecting infrared radiation emitted from a taggant material sample following the excitation of the sample by accurately measuring the decay time of the radiation of the particular taggant being used. These systems, however, do not involve detection and authentication of moving value documents.

U.S. Pat. No. 5,459,323 to Morgan discloses an apparatus for producing decay time weighted information (e.g. a decay time weighted image) of a luminescent sample, comprises an excitation light source arranged to illuminate the sample, means for modulating or pulsing the intensity of the excitation light in a predetermined cyclical manner, detector means for detecting photons emitted by the sample as a result of luminescence, means for storing data representative of detected photons, the stored data being weighted as a function of phase difference between detection of photons and the cyclically varying modulation, and means for producing decay time weighted information from the stored data. This technique, however, only works when the luminescent sample is stationary, since any movement of the sample compounds the phase difference detection.

Notwithstanding the existing validation systems for authenticating value documents, there exists a need for a system that reliably and accurately detects moving value documents, such as systems involved with sorting or detecting bank notes. The validation system should incorporate security features in and/or on the value document that are difficult to replicate and should have detection discrimination methods and features that are unique and complicated enough to prevent counterfeiting and forging of the value document. It is also important that these value documents such as bank notes can be authenticated at high speeds.

SUMMARY OF THE INVENTION

In one aspect, an apparatus is provided that authenticates a value document moving at a uniform velocity and which comprises a pre-selected covert composition that absorbs exciting incident light and emits optical radiation having a pre-selected emission wavelength. The apparatus includes an exciting light source that produces illumination of sufficient intensity to excite the pre-selected covert composition within an area illuminated by the exciting light source. Optionally, the apparatus includes an optical filter that filters the pre-selected emission wavelength emitted from the pre-selected covert composition within the illuminated area. The apparatus also includes a first detector element and a second detector element housed in at least one photodetector, wherein the first detector element receives a first image of an area of the value document at a first time and outputs electronic signal data for the first image, and the second detector element receives a second image of substantially the same area of the value document at a second time and outputs electronic signal data for the second image, the first and second images corresponding to decay time intensity of the pre-selected emission wavelength emitted from the pre-selected covert composition. The apparatus further includes a processing unit that collects and evaluates the output electronic signal data, and determines pass or failure data for the value document.

In another aspect a method of authenticating a value document is provided for value documents that include a pre-selected covert composition that absorbs exciting incident light and emits optical radiation. The method includes moving the value document at a uniform velocity past an illuminated area produced by an exciting light source that produces illumination having sufficient intensity to excite the pre-selected covert composition. The method can optionally filtering a pre-selected emission wavelength from the pre-selected covert composition within the illuminated area when the value document passes a detection window with an optical filter. The method also includes providing a first image of an area of the value document to a first detector element housed in at least one photodetector at a first time, and providing a second image of substantially the same area of the value document to a second detector element housed in the at least one photodetector at a second time. The method further includes outputting electronic signal data for the first and second images from the photodetector. The method can also include collecting the output electronic signal data in a processing unit, and determining a pass or fail condition for the value document.

BRIEF DESCRIPTION OF THE DRAWINGS

Specific examples have been chosen for purposes of illustration and description, and are shown in the accompanying drawings, forming a part of the specification.

DETAILED DESCRIPTION OF THE INVENTION

Figure 1:
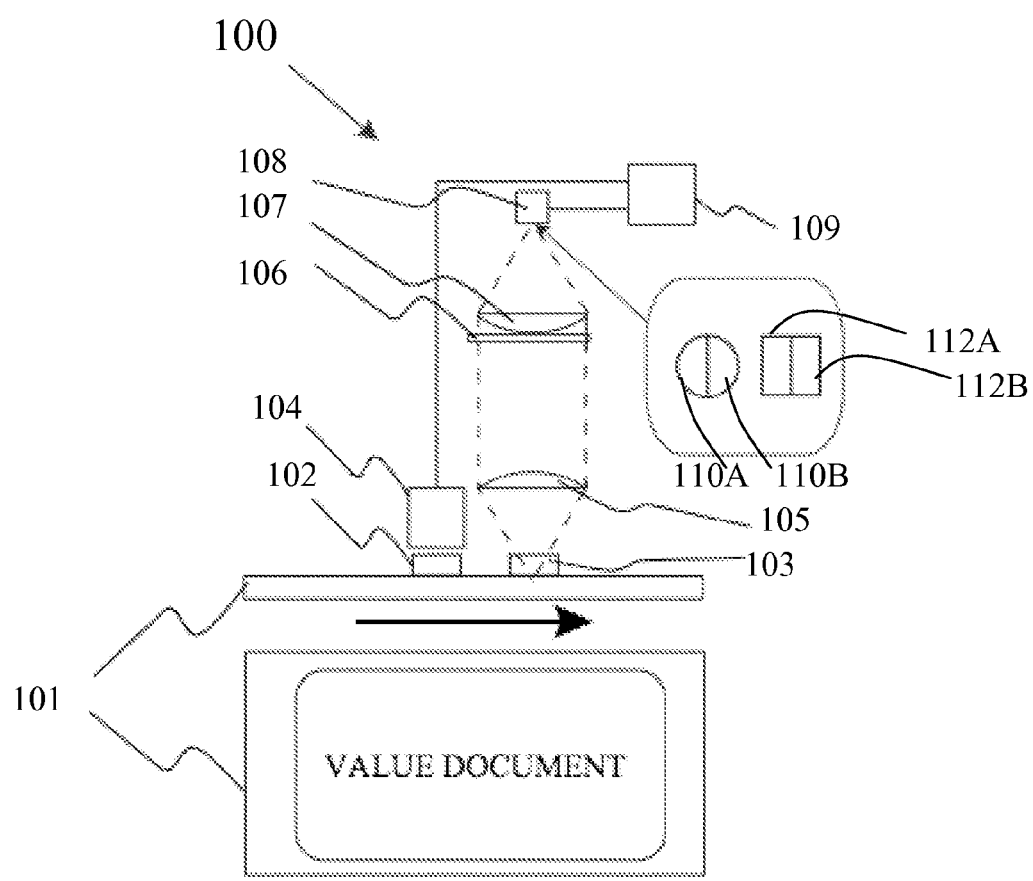
FIG. 1 illustrates a schematic diagram of one example of an authentication apparatus wherein a value document moves under an exciting light source and emitted optical radiation intensity from an active ion in a pre-selected covert composition on or in the value document is first filtered and then received by a bi-cell photodetector having a first detector element and a second detector element which measure time decay characteristics of the active ion.

The present technology increases security and authenticity precision of a validation system by combining optical emission wavelength detection with detection of decay time characteristics of an emitting active ion in or on a value document. More specifically, the present technology relates to a value document authentication apparatus and method of detection that functions by detecting at least one pre-selected active ion within a pre-selected covert composition that is in or on a value document moving at a constant velocity. The at least one pre-selected active ion can be, for example, at least one infrared emitting phosphor. The at least one pre-selected active ion can be excited by a light source, wherein the light source illuminates the at least one pre-selected active ion within an illuminated area of the moving value document. Upon excitation, the at least one pre-selected active ion can emit radiation having a pre-selected wavelength. In at least one example, the pre-selected wavelength of the emission from the at least one pre-selected active ion is in the infrared spectrum. Since multiple emission wavelengths are possible, the emission wavelengths of the radiation emitted from the excited active ion, or active ions, can be filtered to pass only a pre-selected emission wavelength to at least one photodetector, wherein the at least one photodetector captures decay time intensity data. The decay time intensity data can then be evaluated in a central processing unit (CPU). The CPU indicates whether or not a value document is authentic.

Suitable covert compositions to be used in the present technology have at least one detectable emission wavelength and measurable decay time intensity. The at least one active ion within the pre-selected covert composition typically has a decay time greater than 0.1 milliseconds to 10 milliseconds. For instance, a suitable pre-selected covert composition having a short decay time includes yttrium aluminum garnet (YAG) doped with neodymium, which has a decay constant of about 0.2 milliseconds. An example of a suitable pre-selected covert composition having a long decay time includes YAG doped with holmium, which has a decay constant greater than 6 milliseconds. It is also acceptable to have multiple phosphors comprising the same or different emitting active ions wherein both of the active ions emit within the same pre-selected emission wavelength band, but one has a long decay time and the other one has a short decay time. The intensity value of the emission from the at least one active ion is time dependent, and diminishes more rapidly for a material that has a short decay time than one that is longer. Accordingly, in order to achieve a sufficient level of detectability, an appropriate distance between the first and second detectors, and thus an appropriate time between the between the first and second images, may be selected for a particular covert composition. Alternatively, the amount of the compound in the value document may be increased to allow detectability when the second image is received.

In the present technology, a light source such as a high-energy light source, LED light or a laser illuminates, in an overlapping pattern, an illuminated area incident to a moving value document thereby exciting at least one active ion within the pre-selected covert composition included in or on the value document. In at least one example, the light source can provide infrared illumination. The active ion begins to decay immediately after it is excited. The light source may have non-changing or gradually changing illumination intensity as a function of time; however, uniformity of intensity distribution across the illuminating beam is not required. The width of the light source may be smaller, equal to or greater than the width of a detection window connected to the detection apparatus, as long as the light source has sufficient intensity and width to excite the pre-selected active ion. The illumination intensity from the exciting light source can pass through an exciting light source window, which projects the illumination intensity at a pre-determine width, corresponding to the width of the illuminated area, onto the moving value document. In turn, the width of the illuminated area corresponds to the width of the excitation emission. It is preferable to have the excitation emission width equal to about the width of the area of the value document that is imaged onto the first and second detector elements of the at least one photodetector. While having a wider excitation emission provides no benefit, a narrower excitation emission may still be acceptable since the at least one photodetector only measures the photons that fall on the surface of the detector elements and what was impinging on the first detector element will impinge on the second detector element at a later time.

Upon illumination, optical radiation is emitted by the pre-selected covert composition and may be filtered by an optical filter to assure that only the pre-selected emission wavelength is detected by the at least one photodetector. An optical filter can be, for example, a single filter or a combination of filters such as long pass spectral filters, short pass filters, bandpass filters, colored glass, other optical filters known in the art, and other spectral band limiters known in the art. While optional in certain cases, the use of an optical filter is preferred. The purpose of the filtering may be to achieve sufficient signal to noise ratio in the detection to be able to authenticate with a high degree of certainty. In the case of a counterfeit document that fails to have the pre-selected emission wavelength band, it is not necessary to collect decay time intensity data, and the document may be rejected by the present validation system as a counterfeit. In examples using an optical filter, after the optical radiation, which decays exponentially as a function of time, is filtered by the optical filter associated with the pre-determined emission wavelength passband, it can be detected by the first and second detector elements, which capture decay time intensity data as a function of distance from the illuminated area on the moving value document as a series of images. The emitted radiation may be captured by the first and second detector elements as an electronic signal that is proportional to the photon flux in an image at pre-selected image locations that are a pre-determined distance from the illuminated area of the moving document. Generally, the illuminated area on the moving value document is a pre-determined distance from the at least one detection window of the at least one photodetector so that no light from the incident exciting light source enters the at least one photodetector through the optional wavelength filter. The first measured image location may be separated by a distance that represents a time that is between 0.5 to 2 decay time constants of the pre-selected active ion, depending on the velocity of the value document. This amount of time is generally chosen to prevent excitation light from entering the detection window when it scatters off of the value document surface. In at least one example, the present authentication apparatus validates the authenticity of a moving value document with acceptable accuracy at velocities in the range of 1 to 12 m/s.

One type of photodetector that is suitable for use with the present technology is bi-cell photodetector 100 illustrated in FIG. 1. The bi-cell photodetector 100 houses two adjacent detector elements of the same detection material, such as silicon or InGaAs, wherein a first detector element and a second detector element are assembled to form a split or separation line, as shown by first and second detector elements 110A and 110B, and first and second detector elements 112A and 112B. One example of a commercially available bi-cell photodetector is the detector model SD113-24-21-021, which is manufactured by Advanced Photonix. The separation line is oriented perpendicular to the movement plane of the value document. Since the value document is moving at a constant velocity, e.g. via rollers or belts, under the bi-cell photodetector, the image from the first image location on the value document is relayed to the first detector element, while the image from an adjacent second image location in the value document is relayed to the second detector element of the bi-cell photodetector. A bi-cell photodetector may also be constructed from a quad-cell photodetector wherein two pairs of photodetectors are configuration to function similar to a bi-cell photodetector. This quad-cell alteration could by performed by one skilled in the art using standard techniques. An acceptable bi-cell photodetector is typically a 2.54 mm device with the first and second detector elements each having a dimension of 1.22 mm. Preferably, the width of the bi-cell photodetector will be in the range of 0.5 to 6 millimeters. The bi-cell photodetector may have a circular, rectangular, or square shape. The first and second detector elements of a circular bi-cell photodetector are each semicircle in shape, whereas they are both rectangular in shape for a square bi-cell photodetector. The illuminated area on the value document is typically the width of the bi-cell detector aperture, which is the diameter of both semicircles of the individual element.

A bi-cell photodetector to be used with the present technology further comprises an optical imaging system including optical magnification components. An imaging system is used to collect and relay the emitting optical radiation from the value document illumined area within the detection window to the bi-cell photodetector. This imaging system may employ optical magnification components in order to relay the optical radiation to the bi-cell photodetector.

The first and second photodetector elements receive emission decay time intensity data from the pre-selected covert composition as continuously decreasing optical radiation intensity. Where the pre-selected covert composition is uniformly distributed in or on the value document and there are no additional obscurations on the value document, the intensity data received by the bi-cell photodetector is the highest where the imaged area of the value document is closest to the excitation source and the weakest at the furthest point from the excitation of the imaged area of the value document. This relationship is generally an exponential decay of emission intensity as a function of time for most phosphors. When using a bi-cell photodetector in the present technology, the first image location area and the adjacent second image location area of the moving value document are separated from each other by a pre-selected distance, which may be equal to the distance between the first and second detector elements. This distance may be adjusted for any optical magnification/de-magnification effects from an optical imaging system that may be included in the bi-cell photodector. Due to the fixed velocity of the value document, there is a fixed distance and a fixed amount of time that passes between the first image location and the second image location. As a result, the pre-selected emission wavelength from the active ion will predictably decay due to its material properties.

As mentioned above, the filtered pre-selected emission wavelength emitted by the active ion is imaged at the first detector element and at the second detector element of the bi-cell photodetector. Since the bi-cell photodetector comprises two detector elements, each individual image is spatially split between the two detector elements. Thus, the bi-cell photodetector elements simultaneously receives and splits an image wherein each of the first and second detector elements receives half of the image and both then generate corresponding electronic signals that are transmitted to the CPU for processing. The first half of the image results in greater intensity data coming from the first image location since it is closer to the excitation source than the intensity data from the second image location of the second half of the image. In other words, since the active ion emission intensity decays exponentially as a function of time, from the time of excitation by the exciting light source, the emission intensity data received by the second detector element and its corresponding second detector electronic signal will be smaller in magnitude as compared to the emission intensity data received by the first detector element and its corresponding first detector electronic signal. The ratio of the signal from the electronic signal data output from the second detector element (B) to the electronic signal data output from the first detector element (A) is approximately related to the decay constant of the pre-selected active ion by the equation:

$$\text{Tau}(\tau) = -T/\ln(B/A)$$

where Tau ($\tau$) is approximately the material decay constant, and T is the amount of time in seconds taken to travel from the center of the first detector element to the second detector element assuming an optical magnification of 1. The output electronic signal data from each of the first and second detector elements is delivered to a processing unit, which can compute the measured output electronic signal ratio, which is the ratio of the signal from the electronic signal data output from the second detector element (B) to the electronic signal data output from the first detector element (A). The processing unit may also average the measured output electronic signal ratio from a series of consecutive images to produce an average value of the measured output electronic signal ratio. Computing an average value of the measured output electronic signal ratio can provide greater accuracy and consistency for determining the decay constant Tau of the measured covert composition on a value document and comparing it to the known decay constant Tau of the authentic covert composition.

As used herein, the phrase "output electronic signal ratio" refers to the ratio of the electronic signal from the second detector element to the electronic signal from the first detector element and is a precise value that may be calculated on the basis of measured or known exponential decay characteristics of the pre-selected active ion, the distance between the first and second detector elements, the bi-cell photodetector dimensions and properties, magnification properties of the imaging system and the velocity of the value document as it moves through the authentication apparatus. Averaging the output electronic signal ratios from the first and second detector elements obtained during multiple consecutive images increases the ratio accuracy. Such averaging may be used to increase the accuracy and reduce the acceptance band of the calculated ratio required to reject a counterfeit value document containing spectrally similar active ions that exhibits a different ratio.

Figure 2:
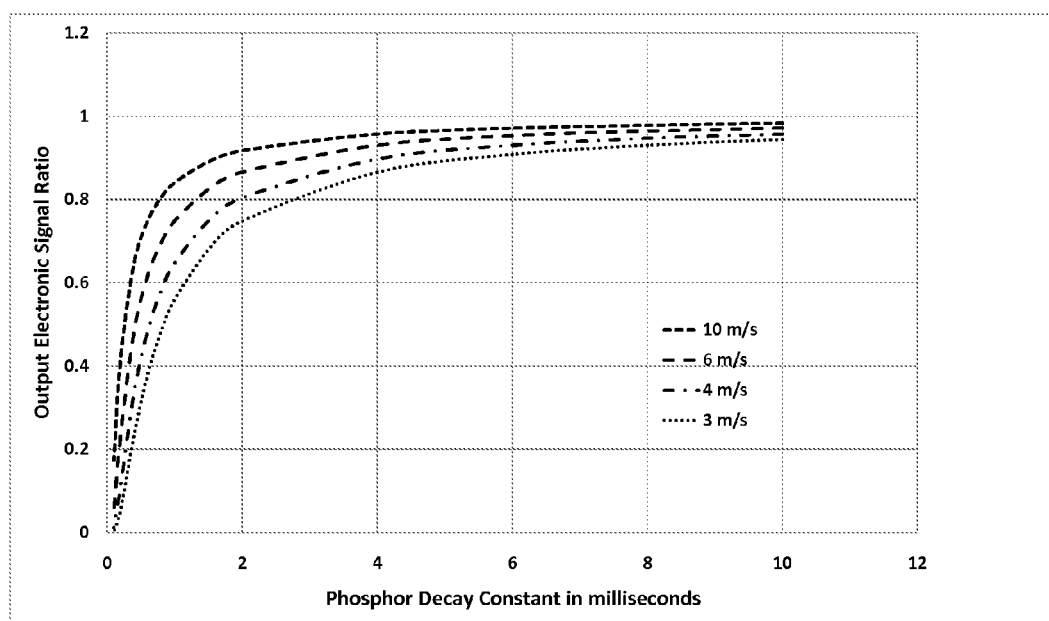
FIG. 2 illustrates the expected output electronic signal ratio determined by using a simulated 4-mm diameter bi-cell photodetector having a first semi-circular detector element and a second semi-circular detector element, both of which measure different decay times of the pre-selected active ion as the value document moves through the authentication apparatus of FIG. 1 at the constant velocities indicated in FIG. 2.

The output electronic signal ratio, which corresponds to the decay time intensity data collected by the bi-cell photodetector, will not only be impacted by the actual decay time of the active ion, but will also be affected by the distance between the first and second detector elements of the bi-cell photodetector and the constant velocity of the value document as it moves through the authentication apparatus as depicted in FIG. 2. When the electronic signal ratio is very close to 1, the ability to discriminate the decay times is poor unless the system averages the intensity data from the first and second detector elements from a number of consecutive images. The more consecutive images that are used for averaging will increase the ability of the authentication system to discriminate. By averaging, the system will obtain a ratio that is acceptable for discrimination, such as a ratio of 0.97+/−0.01. The authentication apparatus may be designed to authenticate output electronic signal ratios in the range of 0.05 to 0.98 depending on the sensitivity and noise rejection of the detector, especially since the illumination from the exciting light source does not interfere with the detection of the emission from the active ion. In addition, since the bi-cell photodetectors may have a circular geometry, the intensity data output by each of the first and second detector elements may be mathematically calculated by integrating across the exposed area of each detector element. One skilled in the art would be able to perform these calculations. Based on geometric considerations, the output electronic signal ratio would be expected to be different for a square bi-cell photodetector as compared to a circular bi-cell photodetector.

The value document authentication apparatus of the present technology may determine pass data, thus validating, a value document if it calculates the measured output electronic signal ratio received from the first and second detector elements and determines that the measured output electronic signal ratio is within a pre-determined tolerance range of the at least one active ion of a known authentic covert composition. The pre-determined tolerance range can be selected based upon a reasonable amount of experimental error that may be introduced in performing authentication of the value document. For example, a pre-determined tolerance range can be a one sigma standard deviation of up to about 2% of the ratio of the signals. If a different active ion or the same active ion within a different host lattice were to be used by a counterfeiter having emission wavelengths similar to the pre-determined emission wavelength, the counterfeit document would be authenticated by any prior art validation system that only detects and validates based on a specific emission wavelength. The apparatus of the present technology, however, would likely reject the counterfeit document as not having the decay characteristics of the pre-selected active ion because phosphors have compositional characteristic decay times as a function of host lattice, formation temperature, doping levels and the like. Additionally, if the output electronic signal ratio is not within the pre-determined tolerance range, the value document will be rejected as counterfeit.

In one example of the present technology, the pre-selected covert composition is uniformly incorporated into or onto the substrate of the value document. This may be achieved by uniformly mixing the pre-selected covert composition within the substrate paper pulp or by printing a uniform underlayer of the pre-selected covert composition uniformly mixed in an ink base onto the substrate of the value document. Due to the uniform distribution, the output electronic signal ratio measured between the second detector element electronic signal and the first detector element electronic signal of the bi-cell photodetector remains constant and reflects the decay characteristics of the pre-selected active ion when an unprinted/unsoiled location of the value document is imaged. A value document will be authenticated when the output electronic signal ratio falls within the pre-determined tolerance range. A number of consecutive images may be taken at each of the first and second detector elements. The corresponding consecutive output electronic signal ratios may be averaged to improve the accuracy of the system.

The first detector element and second detector element of the bi-cell photodetector collect decay time intensity data in the form of electronic signals from adjacent but different portions of the moving value document when the image is captured. If these portions of the value document have different concentrations of the active ion, are covered by different levels of attenuating print, or if the emitting active ion is incorporated in the print ink and not in the value document substrate, then the output electronic signal ratio will account for both phosphor decay and the amount of phosphor excited as described in more detail below.

In another example of the present technology, a value document does not have a uniform distribution of a pre-selected covert composition such as when the covert composition is added to a printing ink with varying print density. Alternatively, a value document substrate with a uniform distribution of a pre-selected covert composition may be printed with an obscurant such as an absorbing ink thereby creating non-uniform distribution of phosphor emissions. This means that the first detector element may detect emission intensity from a different amount of available phosphors as compared to the second detector element. In any event, when the print pattern on the value document is varied and/or the amount of the pre-selected covert composition available is different from place to place on the value document, the document will be treated as having non-uniform distribution of the pre-selected covert composition. In such case, the output electronic signal ratio measured will be a combination of both decay behavior of the phosphor as well as the amount of phosphor present considering any attenuation of the emission signal due to the printing at each location. For accurate authentication, both the first detector element and second detector element will image the same area, or at least substantially the same area, of the moving value document over time. Accordingly, the first detector element can receive an image from an area of the value document at a first time, and the second detector element can receive an image of the same area, or substantially the same area, of the value document at a second time. This may be accomplished by separating the first and second image locations by an amount of time that allows the first detector element image to be coincident with the second detector element during a subsequent image reading. As used herein, the phrase "coincidence time period" is defined as the amount of time required for the first detector element image to become approximately the same spatial image location detected at the second detector element at a later time. The coincidence time period may be selected to be the very next image whereby the first detector element first image location will be coincident with the first image location of the second detector element. The authentication system will be sufficiently accurate if each imaged section of the document that is measured by the first detector element is also approximately measured by the second detector element. The software within the authentication apparatus may be designed to select the appropriate coincidence images for calculating the average output electronic signal ratio to produce valid results for value document with non-uniform distribution of pre-selected covert composition. Thus, the processing unit of the present authentication apparatus can authenticate or reject a value document with a non-uniform distribution of a pre-selected covert composition despite any variable absorption of emission intensity by printed matter present on the value document, as it does not affect the measured output electronic signal ratio if averaged over a number of consecutive images taken from the value document. The corresponding calculated ratios may be averaged to improve the accuracy of the system.

FIG. 1 illustrates a schematic diagram of the authentication apparatus 100 wherein a value document 101 is moved under an exciting light source window 102 and detection window 103. The exciting light comes from the phosphor exciting light source 104 and passes through the exciting light source window 102 to excite the active ion contained in or on the value document 101, within an illuminated area on the value document. The optical radiation from the active ion is roughly collimated by lens 105 and passed by an optical filter 106 to isolate the pre-selected emission wavelength of the active ion incorporated in the pre-selected covert composition. The pre-selected emission wavelength is then focused by lens 107 onto the bi-cell photodetector 108. As illustrated in the detail view in FIG. 1, the bi-cell photodetector 108 can be circular, having a first detector element 110A and a second detector element 110B, or can be rectangular or square, having a first detector element 112A and a second detector element 112B. The output electronic signal ratio relates to the decay characteristics of the active ion. The central processing unit (CPU) 109 can collect the output electronic signals from the first and second detector elements 110A and 110B or 112A and 112B at pre-determined intervals relating to pre-selected distances from the illuminated area on the value document, calculate the measured output electronic signal ratio, determine pass or failure data for the value document, and output the pass or failure data to indicate to an operator whether the value document is authentic. One way in which the CPU 109 can determine pass or failure data for the value document is to compare measured output electronic signal ratio to stored data corresponding to a known authentic covert composition. The CPU can also average the measured output electronic signal ratio from consecutive images to increase the accuracy of the measurement of the validation system.

FIG. 2 illustrates the expected output electronic signal ratio of emitting phosphors having different characteristic decay times moving through the authentication apparatus at the indicated speeds as measured using a simulated 4-mm bi-cell photodetector with two semi-circular first and second detector elements assembled together with a split line that is perpendicular to the movement plane of the value document. Short life time ratios provide an output electronic signal ratio as low as 0.05, while long life time phosphors provide a ratio as high as 0.97, especially at high velocities of the value document. The bi-cell photodetector produces a highly accurate validation system, wherein it detects intensity data used to calculate the output electronic signal ratio in order to discriminate the pre-selected active ion in or on the value document.

Having thus described the invention in rather full detail, it will be understood that such detail need not be strictly adhered to, but that additional changes and modifications may suggest themselves to one skilled in the art, all falling within the scope of the invention as defined by the subjoined claims.

Other types of photodetectors can also be used in some examples of the present technology. Accordingly, although the specific example of a bi-cell photodetector is discussed above, it should be understood that it is one example, and the present technology is not limited to bi-cell photodetectors. For example, the first and second detector elements can be separated, and can be housed separately, which can improve accuracy. In such a method, the bi-cell sensor element can be physically split into two separate sensors, or two separate sensors of the same type can otherwise be provided, placing a much larger separation between each photodetector element. In this example, a separate optical system can be provided to address the increased separation, but the method of signal sampling would remain the same. With respect to the data acquisition, the data sampling rate can be synchronized such that the area sampled under the first detector element is also fully sampled under the second detector element at a later time, the same method as described for the bi-cell application. The requirements on the sensor elements and optical system remain the same as described above with respect to the bi-cell photodetector. The computations can also be the same, whereas the individual signal values are divided for the same spatial area of the note interrogated by taking the value from the second sensor element and dividing it by the value from the first sensor element. The sum of the signals of the second sensor can also be divided by the sum of the signals from the first sensor, for the length of the value document, to increase accuracy through statistical methodology. In this example, it is possible to maximize the accuracy of the decay time measurement in cases where the decay time constant, Tau, is long compared to the separation of the first and second detector elements combined with the transport speed of the value document. Higher degrees of accuracy can be obtained when the signal level has decayed to ~1/e value as measured at the second detector element and comparing that value to the same spatial area measured from the first detector element. If the value document speed is known, the detector element separation can be calculated for a pre-selected taggant. Preferably, the data sampling is an integral multiple of the chosen distance such that the same area is read by each detector element, but at a different time.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. An apparatus that authenticates a value document moving at a uniform velocity and which comprises a pre-selected covert composition that absorbs exciting incident light and emits optical radiation having a pre-selected emission wavelength, the apparatus comprising:
    an exciting light source that produces illumination of sufficient intensity to excite the pre-selected covert composition within an area illuminated by the exciting light source;
    optionally an optical filter that filters the pre-selected emission wavelength emitted from the pre-selected covert composition within the illuminated area;
    a first detector element and a second detector element housed in at least one photodetector, wherein the first detector element receives a first image of an area of the value document at a first time and outputs electronic signal data for the first image, and the second detector element receives a second image of substantially the same area of the value document at a second time and outputs electronic signal data for the second image, the first and second images corresponding to decay time intensity of the pre-selected emission wavelength emitted from the pre-selected covert composition; and
    a processing unit that collects and evaluates the output electronic signal data, and determines pass or failure data for the value document.

2. The apparatus as recited in claim 1, wherein the optical radiation has a decay time constant in the range of 0.1 millisecond to 10 milliseconds.

3. The apparatus as recited in claim 1, wherein the photodetector is a bi-cell photodetector that houses both the first detector element and the second detector element, and the width of the bi-cell photodetector is from about 0.5 millimeters to about 6 millimeters.

4. The apparatus as recited in claim 3, wherein the bi-cell photodetector comprises a first semi-circular shape detector element and second semi-circular shape detector element.

5. The apparatus as recited in claim 3, wherein the bi-cell photodetector comprises a first rectangular shape detector element and second rectangular shape detector element.

6. The apparatus as recited in claim 1, wherein the exciting light source comprises a high-energy light source, LED light or a laser.

7. The apparatus as recited in claim 1, wherein the first image and the second image are offset by a distance that represents a time that is between 0.5 to 2 decay time constants of the emission of the optical radiation when the value document is moved at the uniform velocity.

8. The apparatus as recited in claim 1, wherein the uniform velocity of the moving value document is in the range of 1 to 12 m/s.

9. The apparatus as recited in claim 1, wherein the processing unit determines pass or failure data for the value document by comparing measured output electronic signal ratio to stored data corresponding to a known authentic covert composition.

10. The apparatus as recited in claim 1, wherein the value document is a bank note.

11. The apparatus as recited in claim 1, wherein the exciting light source provides infrared illumination.

12. The apparatus as recited in claim 1, wherein the pre-selected emission wavelength is in the infrared spectrum.

13. A method of authenticating a value document comprising a pre-selected covert composition that absorbs exciting incident light and emits optical radiation, comprising:
    moving the value document at a uniform velocity past an illuminated area produced by an exciting light source that produces illumination having sufficient intensity to excite the pre-selected covert composition;
    optionally filtering a pre-selected emission wavelength from the pre-selected covert composition within the illuminated area when the value document passes a detection window with an optical filter;
    providing a first image of an area of the value document to a first detector element housed in at least one photodetector at a first time;
    providing a second image of substantially the same area of the value document to a second detector element housed in the at least one photodetector at a second time;
    outputting electronic signal data for the first and second images from the at least one photodetector;
    collecting the output electronic signal data in a processing unit; and
    determine pass or failure data for the value document.

14. The method of claim 11, wherein the processing unit determines pass or failure data for the value document by comparing measured output electronic signal ratio to stored data corresponding to a known authentic covert composition.

15. The method of claim 11, wherein the value document is a bank note.

16. The method of claim 11, wherein the exciting light source provides infrared illumination.

17. The method of claim 11, wherein the pre-selected emission wavelength is in the infrared spectrum.

* * * * *